(12) United States Patent
Springer

(10) Patent No.: US 9,288,320 B2
(45) Date of Patent: Mar. 15, 2016

(54) SYSTEM AND METHOD FOR SERVICING A CALL

(75) Inventor: Stephen R. Springer, Needham, MA (US)

(73) Assignee: Nuance Communications, Inc., Burlington, MA (US)

( * ) Notice: Subject to any disclaimer, the term of this patent is extended or adjusted under 35 U.S.C. 154(b) by 97 days.

(21) Appl. No.: 13/327,319

(22) Filed: Dec. 15, 2011

(65) Prior Publication Data

US 2013/0156171 A1  Jun. 20, 2013

(51) Int. Cl.
*H04M 1/64* (2006.01)
*H04M 3/493* (2006.01)
*H04M 3/42* (2006.01)

(52) U.S. Cl.
CPC .............. *H04M 3/493* (2013.01); *H04M 1/64* (2013.01); *H04M 3/42068* (2013.01); *H04M 2203/2066* (2013.01); *H04M 2203/551* (2013.01); *H04M 2203/555* (2013.01)

(58) Field of Classification Search
CPC ................... H04M 3/53325; H04M 2201/40
USPC .................................. 379/88.18, 71, 265.01
See application file for complete search history.

(56) References Cited

U.S. PATENT DOCUMENTS

| | | | |
|---|---|---|---|
| 6,061,433 A | 5/2000 | Polcyn et al. | |
| 6,697,460 B2 * | 2/2004 | Knott et al. | 379/88.22 |
| 6,704,410 B1 * | 3/2004 | McFarlane et al. | 379/265.05 |
| 6,885,733 B2 | 4/2005 | Pearson et al. | |
| 7,065,188 B1 | 6/2006 | Mei et al. | |
| 8,155,276 B2 | 4/2012 | Beauregard et al. | |
| 8,243,900 B2 | 8/2012 | Kumhyr | |
| 8,345,835 B1 | 1/2013 | Or-Bach et al. | |
| 8,369,495 B1 | 2/2013 | Mallenahally Channakeshava | |
| 8,396,195 B2 | 3/2013 | Malik et al. | |
| 8,488,774 B2 | 7/2013 | Mahalaha et al. | |
| 8,494,148 B2 | 7/2013 | Erhart et al. | |
| 8,767,927 B2 | 7/2014 | Springer | |
| 8,767,928 B2 | 7/2014 | Springer | |
| 2002/0141561 A1* | 10/2002 | Duncan | H04L 51/04 379/220.01 |
| 2003/0108183 A1* | 6/2003 | Dhir et al. | 379/265.01 |
| 2004/0005047 A1* | 1/2004 | Joseph et al. | 379/265.01 |
| 2005/0286705 A1* | 12/2005 | Contolini et al. | 379/265.02 |
| 2006/0259424 A1* | 11/2006 | Turcotte et al. | 705/40 |
| 2007/0041523 A1 | 2/2007 | Paden et al. | |
| 2007/0133759 A1* | 6/2007 | Malik et al. | 379/80 |
| 2008/0101566 A1* | 5/2008 | Medved et al. | 379/93.25 |
| 2008/0181371 A1 | 7/2008 | Merrow et al. | |
| 2010/0158210 A1* | 6/2010 | Awad et al. | 379/88.04 |
| 2010/0278318 A1 | 11/2010 | Flockhart et al. | |

(Continued)

OTHER PUBLICATIONS

International Search Report and Written Opinion issued Mar. 5, 2013 of International Application No. PCT/US2012/069359, filed Dec. 13, 2012.

(Continued)

*Primary Examiner* — Simon King
(74) *Attorney, Agent, or Firm* — Wolf, Greenfield & Sacks, P.C.

(57) ABSTRACT

A call from a caller to an interactive voice response (IVR) system may be serviced based on behavior by the caller in one or more prior calls to the IVR system. The call may be serviced by predicting information to be used in servicing the call. Predicting such information may include analyzing data reflecting behavior by the caller in one or more prior calls to the IVR system.

19 Claims, 7 Drawing Sheets

(56) References Cited

U.S. PATENT DOCUMENTS

| | | |
|---|---|---|
| 2010/0329435 A1 | 12/2010 | Yasrebi et al. |
| 2011/0044431 A1 | 2/2011 | Klemm |
| 2012/0140905 A1 | 6/2012 | Awad et al. |
| 2012/0148032 A1 | 6/2012 | Blanchard et al. |
| 2012/0328085 A1 | 12/2012 | Daye et al. |
| 2013/0094646 A1 | 4/2013 | Akula et al. |
| 2013/0156165 A1 | 6/2013 | Springer |
| 2013/0156170 A1 | 6/2013 | Springer |

OTHER PUBLICATIONS

International Preliminary Report on Patentability mailed Jun. 26, 2014 of International Application No. PCT/US2012/069359, filed Dec. 13, 2012.

* cited by examiner

| App ID | Timestamp | Caller ID | App Data 1 | App Data 2 |
|---|---|---|---|---|
| 4 | 6/1/11 1:23 PM | 505-555-1212 | FLIGHT STATUS | PN6SJ5X34 |
| 4 | 6/1/11 2:00 PM | 505-555-1212 | FLIGHT STATUS | PN6SJ5X34 |
| 4 | 6/1/11 2:30 PM | 505-555-1212 | FLIGHT STATUS | PN6SJ5X34 |
| 5 | 6/1/11 1:00 PM | 404-404-4444 | TRACK | 1Z22342357232X234 |
| 5 | 6/5/11 1:30 PM | 404-404-4444 | TRACK | 1Z24523957232X234 |
| 5 | 6/9/11 2:30 PM | 404-404-4444 | TRACK | 1Z24523957232X234 |

FIG. 2

SYSTEM AND METHOD FOR SERVICING A CALL

FIELD OF INVENTION

The techniques described herein are directed generally to the field of interactive voice response systems, and more particularly to techniques for servicing calls with interactive voice response systems.

BACKGROUND

Interactive voice response (IVR) systems allow people to interact with a computerized system using voice. An IVR system allows a person interacting with the IVR system to provide input by using keys on a telephonic keypad or a computer keyboard, and/or by speaking. IVR systems typically present acoustic output to the person by playing either pre-recorded or dynamically-generated speech, and/or may provide output using other sources of audio.

An IVR system can support one or more IVR applications, with each IVR application designed to serve a particular function. As one example, businesses often deploy IVR applications to automate one or more interactions with their customers. For example, a customer may use an IVR application to obtain specific information (e.g., an account balance, a flight status, a movie showing time, etc.) or perform a more complex operation such as placing an order for a product or service, selling a stock, resolving a billing question, etc.

In a typical usage scenario, a customer's call is routed to an IVR system supporting the IVR application used to service the customer's call. The IVR application collects specific information it desires from the caller to service the call and, in turn, provides the caller with information the caller seeks or performs a task the caller requests. For example, a customer of a shipping company may call the shipping company to inquire about the status of a package the customer is waiting to receive. The call may be routed to an IVR system supporting an IVR application for helping customers track packages. To service this call, the IVR application prompts the customer to provide information such as the tracking number. After obtaining all the desired information, the IVR application determines the status of the package and provides the customer with the requested information about the identified package.

SUMMARY

One embodiment is directed to a method for servicing a call between a caller and an IVR system, the method comprising servicing the call by predicting information to be used in servicing the call, wherein the predicting comprises analyzing, with a processor, data reflecting behavior by the caller in one or more prior calls with the IVR system.

Another embodiment is directed to a system for servicing a call between a caller and an IVR system, the system comprising at least one processor programmed to service the call by predicting information to be used in servicing the call, wherein the predicting comprises analyzing data reflecting behavior by the caller in one or more prior calls with the IVR system.

Another embodiment is directed to at least one non-transitory computer readable storage medium storing processor-executable instructions that, when executed by at least one processor, cause the at least one processor to perform a method of servicing a call between a caller and an IVR system, the method comprising servicing the call by predicting information to be used in servicing the call, wherein the predicting comprises analyzing data reflecting behavior by the caller in one or more prior calls with the IVR system.

Another embodiment is directed to an IVR system configured to service calls from a plurality of callers, the IVR system comprising a dialog module configured to gather information for the IVR system, wherein for a call from a caller, the dialog module is configured to gather at least some of the information used by the IVR system to service the call based at least in part on data reflecting behavior by the caller in one or more prior calls with the IVR system.

Another embodiment is directed to a method for gathering information for an IVR system, wherein the IVR system is configured to service calls from a plurality of callers, the method comprising gathering, for a call from a caller, at least some of the information used by the IVR system to service the call based at least in part on data reflecting behavior by the caller in one or more prior calls with the IVR system.

Another embodiment is directed to at least one non-transitory computer-readable storage medium storing processor-executable instructions that, when executed by at least one processor, cause the at least one processor to perform a method for gathering information for an IVR system, wherein the IVR system is configured to service calls from a plurality of callers, and wherein the method comprises gathering, for a call from a caller, at least some of the information used by the IVR system to service the call based at least in part on data reflecting behavior by the caller in one or more prior calls with the IVR system.

Another embodiment is directed to a method for servicing a call between a caller and an IVR system, the method comprising servicing the call by predicting information to be used in servicing the call, wherein the predicting comprises analyzing, with a processor, data reflecting behavior by one or more other callers in one or more prior calls with the IVR system.

Another embodiment is directed to a system for servicing a call between a caller and an IVR system, the system comprising at least one processor programmed to service the call by predicting information to be used in servicing the call, wherein the predicting comprises analyzing data reflecting behavior by one or more other callers in one or more prior calls with the IVR system.

Another embodiment is directed to at least one non-transitory computer-readable storage medium storing processor-executable instructions that, when executed by at least one processor, cause the at least one processor to perform a method of servicing a call between a caller and an IVR system, the method comprising servicing the call by predicting information to be used in servicing the call, wherein the predicting comprises analyzing, with a processor, data reflecting behavior by one or more other callers in one or more prior calls with the IVR system.

Another embodiment is directed to an IVR system configured to service calls from a plurality of callers, the IVR system comprising a dialog module configured to gather information for the IVR system, wherein for a call from a caller, the dialog module is configured to gather at least some of the information based at least in part on data reflecting behavior by one or more other callers in one or more prior calls with the IVR system.

Another embodiment is directed to a method for gathering information for an IVR system, wherein the IVR system is configured to service calls from a plurality of callers, the method comprising gathering, for a call from a caller, at least some of the information used by the IVR system to service the call based at least in part on data reflecting behavior by one or more other callers in one or more prior calls with the IVR system.

Another embodiment is directed to at least one non-transitory computer-readable storage medium storing processor-executable instructions that, when executed by at least one processor, cause the at least one processor to perform a method for gathering information for an IVR system, wherein the IVR system is configured to service calls from a plurality of callers, and wherein the method comprises gathering, for a call from a caller, at least some of the information used by the IVR system to service the call based at least in part on data reflecting behavior by one or more other callers in one or more prior calls with the IVR system.

BRIEF DESCRIPTION OF DRAWINGS

The accompanying drawings are not intended to be drawn to scale. For purposes of clarity, not every component may be labeled in every drawing. In the drawings:

FIG. 2 shows an illustrative data structure for storing data associated with one or more calls, in accordance with some embodiments of the present invention.

DETAILED DESCRIPTION

Figure 1:
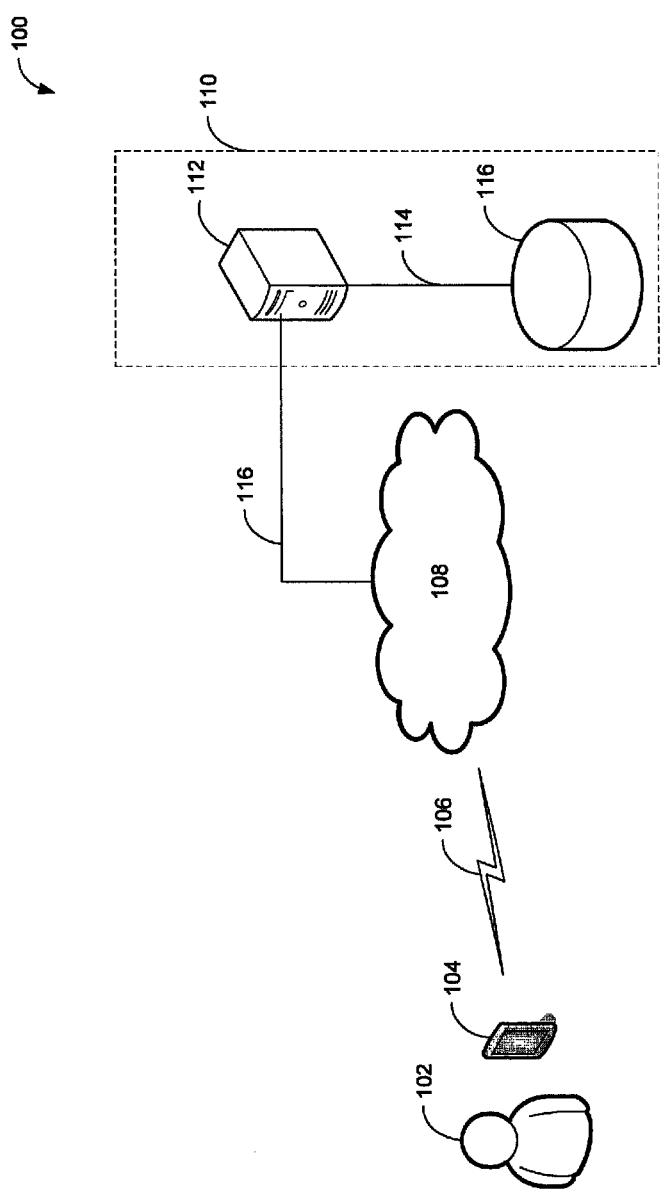
FIG. 1 shows an illustrative environment in which embodiments of the present invention may operate.

Applicants have appreciated that in many usage scenarios it is difficult or inconvenient for the caller to recall the information desired by the IVR application to service the call, and/or difficult for the IVR application to accurately recognize the caller-provided input. For instance, in the above-described package tracking example, a caller may need to provide voice input indicating a multiple-character (e.g., seventeen-character) alphanumeric tracking number, which the caller may not remember and may need to look up. It may be difficult for an automatic speech recognition (ASR) engine of the IVR system to accurately recognize all the characters correctly, and if the system fails to accurately recognize even a single one of the characters correctly, the IVR application may need to re-prompt the caller to provide the tracking number again. This is inconvenient and frustrating to the caller because it takes a greater amount of time to obtain the information the caller called about.

The Applicants have further appreciated that this frustration may be compounded in circumstances where a customer may need to place multiple calls to an IVR system over a period of time for one or more related purposes. For example, a customer may desire to hear the status of a package multiple times during the period that the package is in transit, a caller checking on the status of an airline flight may do this multiple times in a single day, a caller checking the balance of a bank account may do so multiple times per month, etc. In each of these and other scenarios, a caller may need to provide various pieces of information to the IVR system (e.g., alphanumeric tracking number, flight number, bank account information, etc.) during every call. This is both repetitive and, if the IVR system has difficulty recognizing the provided information, particularly frustrating for the caller.

The Applicants have recognized that repeatedly providing the same information to an IVR system is burdensome and frustrating for callers, and that reducing the caller's burden of having to repeat information previously provided to an IVR system may improve interactions between callers and the IVR system, which may make callers more likely to want to use the IVR system again.

The Applicants have also recognized that multiple callers may exhibit common behavior patterns during calls with the IVR system, and that such behavior patterns may be predictive of caller behavior in subsequent calls. For example, an electric utility's IVR system may determine that a high percentage of callers from a certain area code in a certain time period have called to report a power outage. The inventors have appreciated that the IVR system may use this information to further streamline its interaction with another caller calling from the same area code because that caller is likely calling to report a power outage.

Thus, in accordance with some embodiments, an IVR system may improve the way in which it services a call from a caller by using data associated with one or more prior calls by the caller to the IVR system. Gleaning information from one or more prior calls by the caller and using this information to service a new call may obviate the need for the caller to re-enter at least some of the information desired by the IVR system to enable it to service the call. For example, if a caller were to check on a flight status multiple times in one day, the caller's experience may be improved if, after providing the flight number during a first call, the IVR system stored this information and used it to service one or more subsequent calls from the caller so that the caller need not provide the same flight number during one or more subsequent calls.

Additionally or alternatively, an IVR system may improve the way in which it services a call from a caller by using data associated with one or more calls by one or more other callers to the IVR system. Gleaning information from one or more calls by one or more other callers may also obviate the need for the caller to re-enter at least some of the information desired by the IVR system to enable it to service the call. For example, if a caller were to call an IVR system of an electric company to report a power outage, and the IVR system gleaned, from other callers, that there was a power outage in the same area as the caller, the caller's experience may be improved if the IVR system simply asked the caller to confirm whether he is calling to report a power outage, either explicitly or implicitly (e.g., by hanging up if the caller were not calling for another purpose).

The Applicants have appreciated that some conventional IVR systems require callers to provide, repeatedly, multiple inputs to get to a desired result. For instance, a caller might have to press or say "1" for "existing customer," then press or say "4" for "billing department," then press or say "3" for "review statement," and finally press or say "2" for "balance" to have the IVR system output the desired account balance. If a caller wants to check his account balance multiple times, he must repeat this interaction during every call. In accordance with some embodiments, the IVR system may store information from prior calls and use the information to predict what information or service a caller is requesting and provide it to the caller without requiring the caller to progress through the entire call flow typically required. For example, in the foregoing balance checking example, an IVR system may use information from prior calls to identify that a particular caller is likely to be calling to check the account balance and provide that information without requiring the caller to progress through the entire call flow typically required.

Some embodiments described herein address all of the above-described issues of conventional techniques for servicing calls using conventional IVR systems. However, not every embodiment addresses every one of these issues, and some embodiments may not address any of them. As such, it should be appreciated that the present invention is not limited to addressing all or any of the above-discussed issues of these conventional techniques for servicing calls.

As should be appreciated from the foregoing, in some embodiments, an IVR system may service a call from a caller by predicting information to be used in servicing the call. Predicting such information may involve analyzing data associated with one or more prior calls between that caller and the IVR system. In turn, the IVR system may use the predicted information to service the call in any of numerous ways, as the aspects of the invention described herein are not limited in this respect. In some embodiments, the IVR system may use the predicted information to interact with a caller differently than it would have if it did not have access to or leverage the predicted information. For example, the IVR system may alter the flow of the call based at least in part on the predicted information. As one non-limiting example, the IVR system may predict that a caller intends to enter the same information (e.g., a flight number) during a call as the caller entered during one or more prior calls and, instead of prompting the caller to enter this information again, the IVR system may ask the caller to confirm the information. Though, in some embodiments, the IVR system may use the predicted information without even asking the caller to confirm it. If the prediction was correct and the caller was, in fact, going to enter the same piece of information as during a prior call, the caller's experience may be improved because the caller may be able to complete the desired task (e.g., get flight status) faster, and in some circumstances while answering fewer questions and/or without having to look up information to provide to the IVR system.

As one non-limiting example of the above functionality, consider the following example of a caller calling a shipping company that uses a conventional IVR system.

IVR System: "Hello. This is company ABC. How can we help you?"
Caller: "Yeah, I'd like to track a package."
IVR System: "OK. Please enter the tracking number."
Caller: "HB7JA379G."
IVR System: "That was HB7JA379T right?"
Caller: "No, A379G."
IVR System: "Got it. That package is still in route and the expected delivery date is Dec. 10, 2011."

If, on the other hand, an IVR system in accordance with some embodiments of the present disclosure were used by the shipping company, the above interaction may have proceeded as follows.

IVR System: "Hello. This is company ABC. How can we help you?"
Caller: "Yeah, I'd like to track a package."
IVR System: "Oh, hello. Are you calling for an update on the package with the tracking number HB7JA379G?"
Caller: "Yes!"
IVR System: "That package is still en route and expected delivery date is Dec. 10, 2011."

Alternatively, the above interaction between a caller and an IVR system in accordance with some embodiments of the present disclosure may have proceeded as follows.

IVR System: "Hello. Retrieving tracking information for package HB7JA379G. If calling for other purpose, please say 'other'."
Caller: (Silence).
IVR System: "That package is still en route and the expected delivery date is Dec. 10, 2011."

The caller's second and third interactions with the IVR system do not require the caller to re-enter the package tracking number, which, as shown in the first example, may be difficult or inconvenient for the user to provide. In addition, avoiding the need for the caller to provide the information used to service the call may increase the accuracy of the IVR system by avoiding the possibility of a misrecognition error by the ASR engine in recognizing the caller's spoken input, and/or avoiding the possibility of an input error on the part of the caller in typing out that information on the telephonic keypad. This may be particularly beneficial when the input is a relatively long string of alphanumeric characters (e.g., five or more characters, ten or more characters, fifteen or more characters, etc.) that do not form words so that they are spoken by the caller individually (e.g., a package tracking number, an account number, a reference number, etc.). Such character strings can be difficult for an ASR engine to acceptably recognize, and any misrecognition might result in a need for the user to repeat the string, leading to user frustration. Similarly, such character strings can be exceedingly difficult for a user to input correctly using a telephonic keypad. It should further be appreciated that by avoiding the need for the full call flow, the call proceeds faster, leading to an improved experience for the caller.

As previously mentioned, in accordance with some embodiments, an IVR system may service a call based on data associated with one or more prior calls. Data associated with one or more prior calls may be any suitable data, as aspects of the invention are not limited in this respect. For example, in some embodiments such data may comprise information about the caller gathered by the IVR system and, for example, may be information identifying the caller. The information identifying the caller can take any suitable form and, for example, may be biometric information that seeks to identify the caller directly (e.g., using voice identification techniques on the caller's voice), or may seek to identify the caller indirectly through some information that may be associated with the caller (e.g., an account number or other identification optionally associated with authentication information such as a password, an identifier of a telephone number the caller is calling from, an identifier of a link (e.g., telephone) used to place the call, a user name and/or an IP address identifying the source of a voice over Internet Protocol (VoIP) call, etc.). As another example, data associated with one or more prior calls may comprise recordings of at least a portion of any input provided by the caller during these calls (e.g., a recording of at least some of the caller's speech, and/or of at least some other type of input such as dual-tone multi-frequency (DTMF) signals indicating keys the caller pressed or input via a computer keyboard, a mouse or other input device). As yet another example, such data may comprise menu choices made by the caller during one or more prior calls or other type of input.

Additionally or alternatively, the data associated with one or more prior calls may comprise any information gleaned from input provided by the caller during these calls. For example, in some embodiments, the data associated with one or more prior calls may comprise data reflecting the caller's behavior during one or more prior calls, information input by the user during one or more prior calls, etc. It should be appreciated that data associated with one or more prior calls may comprise any of the examples of data described herein, including any combination of the examples described herein. In one non-limiting example, data associated with one or more prior calls may comprise information identifying the caller as well as data reflecting the caller's behavior during one or more prior calls.

A caller's behavior during a call may comprise requesting a service provided by the IVR system. The caller may request any service provided by the IVR system. In the examples discussed above, the caller may request to track a package, check an account balance, or check the status of an airline flight. However, it should be appreciated that these are non-limiting examples, as the techniques described herein can be used with an IVR system providing any type of service.

In addition to requesting a particular service during a call, the caller's behavior during the call may comprise identifying one or more subjects of a service. A subject of a service may be any suitable subject. For example, the caller may identify, using one or more inputs, which package to track, which bank account balance to report, which flight status to check, etc. It should be recognized that these examples are only illustrative and many other examples of services provided by an IVR system and subjects of such services are possible, and the techniques described herein can be used with any of them.

Additionally or alternatively, the caller's behavior during the call may comprise identifying one or more parameters used by the IVR system to deliver the service. The parameters may be any suitable parameters. For example, the parameters may identify a subject of the service. As a specific example, the parameters may be used to identify which flight status to track and, for example, may include a departure city, a destination city and a date. However, this is merely a non-limiting example as the caller may identify any other parameters used by the IVR system to deliver the service.

In some embodiments, data associated with one or more prior calls, between a caller and an IVR system, may be stored, and the IVR system may retrieve at least a portion of this stored data to service a new call with the caller. The retrieved data may be used to predict information potentially useful for servicing the new call. For example, in the case that the retrieved data reflects the caller's behavior in a prior call, these data may provide an indication of the caller's likely behavior during the new call.

It should be appreciated that the various aspects and concepts of the present invention described herein may be implemented in any of numerous ways, and are not limited to any particular implementation technique. Examples of specific implementations are described below for illustrative purposes only, but the aspects of the invention described herein are not limited to these illustrative implementations.

FIG. 1 shows a non-limiting illustrative environment 100 in which embodiments of the present invention may operate. In the illustrative environment, caller 102 may use any device 104 to conduct a call with IVR system 110. Caller 102 may call IVR system 110 one time or multiple times. A call between caller 102 and IVR system 110 may be initiated in any suitable way. For example, caller 102 may initiate a call to IVR system 110, the IVR system may initiate a call to caller 102, the call may be initiated for caller 102 by another party such as by another IVR system or by a customer call representative, etc.

In one embodiment, device 104 may be any suitable mobile device that caller 102 may use to communicate with IVR system 110. For instance, mobile device 104 may be a dedicated mobile phone (e.g., a cellular phone), a mobile smart phone, a personal digital assistant (PDA), a laptop computer, a tablet computer, or any other mobile device capable of supporting a call through a communications medium (e.g., a wired or wireless communications medium). In other embodiments, caller 102 is not limited to making a call by using a mobile device and may use any device capable of supporting a call. For instance, caller 102 may communicate with IVR system 110 by using a telephone connected to landline, a desktop computer connected to a network such as the Internet, or using any other device capable of communicating with IVR system 110. It should also be recognized that if caller 102 participates in multiple calls with IVR system 110, caller 102 is not limited to using the same device for all such calls. Thus, caller 102 may make multiple calls using one or a plurality of different devices, each of which may be any suitable device capable of supporting a call.

A call may be any suitable type of communication that supports voice communications. A call may enable a caller to communicate by allowing the caller to provide acoustic input and/or receive acoustic output. A call is not limited by the type of communications infrastructure or communications medium used to support the call. For example, a call may be a telephone call supported by using a public-switched telephone network, a wireless cellular network, or other telephone network. As another example, the call may be a VoIP call supported by a public (e.g., Internet) or private (e.g., corporate Intranet) network configured to support the Internet Protocol, or any other type of call.

In the illustrated embodiment, device 104 communicates with IVR system 110 through a communication medium 108. Communication medium 108 may be any suitable network or other type of communication medium. For example, communication medium 108 may be a cellular network, a local area network, a circuit-switched telephone network, a public-switched telephone network, the Internet, some combination of any of the foregoing, or any other communication medium capable of supporting telecommunications.

In the illustrated embodiment, device 104 is communicatively coupled to communication medium 108 via wireless connection 106 and IVR system 110 is communicatively coupled to communication medium 108 using a wired connection 116. This is merely for illustration, as device 104 and IVR system 110 each may be communicatively coupled to communication medium 108 in any suitable way including wired and/or wireless connections.

IVR system 110 comprises one or more computers (e.g., servers) each configured to perform processing related to supporting the functionality of the IVR system. In the illustrated embodiment, IVR system 110 comprises a single server 112, though in other embodiments any suitable number of servers may be used and distributed in any manner. For instance, in some embodiments, IVR system may comprise at least ten, at least one hundred, at least one thousand, or at least ten thousand servers. For embodiments in which the IVR system comprises multiple servers, the servers need not be located in the same physical location and may be distributed across multiple physical locations.

Each server, such as server 112, may be configured (alone or in combination with one or more other servers) to support one or more IVR applications and may be configured to execute any other programs. For example, one or more of the servers may be configured to execute programs for supporting functionality related to call management, dialog management, speech recognition, text-to-speech synthesis, and/or any other functions used by an IVR system. An illustrative IVR system is described in greater detail below with reference to FIG. 4.

As previously discussed, a caller, such as caller 102, may conduct one or multiple calls with IVR system 110. Multiple calls may take place over any suitable time period of any suitable length.

As discussed above, IVR system 110 may obtain any suitable data associated with one or more calls between caller 102 and IVR system 110 (e.g., information identifying caller 102, recordings of at least a portion of the input provided by caller 102, any data extracted from input provided by caller 102, data reflecting the behavior of caller 102 in one or more calls, such as one or more services requested by caller 102, information about one or more subjects of each service requested by caller 102, etc.). IVR system 110 may obtain any of the above-described data, associated with one or more calls, in any suitable way. For example, IVR system 110 may extract this data from information collected during a call between caller 102 and IVR system 110. In this case, IVR system 110 may store at least a portion of the obtained data on one or more storage devices 116 so that it may be retrieved from the one or more storage devices to process or service a subsequent call as discussed below.

Storage device(s) 116 may be any suitable storage device(s) or article(s) of manufacture capable of storing information. For example, storage device(s) 116 may be any non-transitory computer readable storage medium or media such as a computer memory (RAM and/or ROM), one or more hard disk drives, one or more optical disks (CDs and/or DVDs), one or more magnetic tapes, one or more flash memories, one or more circuit configurations in Field Programmable Gate Arrays and/or any other suitable device(s).

In the illustrated embodiment, storage device(s) 116 are shown as being part of IVR system 110 and as being connected to server 112 by wired connection 114. It should be appreciated that all embodiments are not limited in this respect. For example, in other embodiments, storage device(s) 116 may be connected to server 112 using any suitable type of connection or communication medium, and may be internal or external to IVR system 110. When storage device(s) 116 are external to IVR system 110, the IVR system may be communicatively coupled to storage device(s) 116 to obtain information from them in any suitable manner.

In some embodiments, data may be mirrored across multiple storage devices so that each of multiple storage devices stores a copy of the data. In this case, when at least a portion of the data is to be retrieved, it may be retrieved from any one of the storage devices storing a copy of the data. The storage device from which to retrieve the data may be selected in any suitable way and based on any suitable criterion. For example, the storage device may be chosen based on an amount of time it takes to retrieve information from the storage device (e.g., a storage device may be selected if the amount of time it takes to retrieve desired data from that storage device is less than two seconds, less than one second, less than half a second, less than a tenth of a second, etc.), or based on any other suitable criteria.

While FIG. 1 shows only a single caller using a single device 104, it should be recognized that embodiments of the present invention are not limited in this respect and that IVR system 110 may be configured to service any number of calls (e.g., hundreds, thousands, or greater), from any number of callers (e.g., hundreds, thousands, or greater) who may be using any number of devices (e.g., hundreds, thousands, or greater). Data associated with one or more calls made by each of multiple callers may be stored on at least one storage device (e.g., storage device 116 and/or on devices that the caller(s) use to conduct the calls).

Regardless of where data associated with one or more calls involving one or more callers may be stored, such data may be stored in any suitable form. FIG. 2 shows a non-limiting example of a data structure 200 that may be used to store data associated with one or more calls in accordance with one embodiment. While in the illustrated embodiment data structure 200 is shown in the form of a table, this is not a limitation of the present invention, as any suitable data structure may be used to store the data.

Data structure 200 may store any suitable data associated with one or more calls between any of one or more callers and an IVR system. In one non-limiting example described below, data structure 200 may store data identifying an IVR application for servicing a call, data identifying the caller, and/or data reflecting behavior of the caller during the call. However, it should be recognized that these examples are not limiting, and that data structure 200 may store any other data associated with one or more calls.

For each call, data structure 200 may store one or more data records. A data record may store any suitable data associated with a call and may store such data in any suitable format (e.g., in one or more fields). Each field may store any suitable amount of data and any suitable type of data and, for example, may store alphanumeric data representing the data directly, or a pointer to another location where data may be stored. In some instances, data structure 200 may store the same type of data record for each call, but this is not a limitation on the data structure or other aspects of the invention described herein, as in other embodiments, data structure 200 may store one type of data record for one call and another type of data record for another call. For example, a data record for one call may store a different amount of data than another data record for another call.

Data structure 200 may store any suitable number of data records. In FIG. 2, data structure 200 is shown as storing six data records, but it should be appreciated that the data structure may store many more (e.g., hundreds, thousands, millions, etc.) data records.

In accordance with one embodiment, the IVR system may support multiple different IVR applications simultaneously. For example, the IVR system may be offered by a service provider that hosts IVR applications for a number of different businesses or other entities that each may have one or more IVR applications to support its businesses or other activities. One example of such an IVR system is on demand hosting of enterprises offered by Nuance Communications, Inc. of Burlington, Mass. For embodiments wherein the IVR system supports two or more IVR applications, the data structure may have an entry in or associated with each record that identifies the IVR application to which the data record pertains. However, a business is not limited to using an IVR system offered by a service provider, and, in other embodiments, a business may operate an IVR system to host one or more applications to support its own businesses or other activities.

Each data record for a call may store any suitable information associated with the call. Among the information stored in the example shown in FIG. 2, each data record stores data identifying an IVR application used to service the call, a timestamp identifying a time of the call, and information identifying the caller. In the illustrated example, this data is stored in "APP ID" field 202, "Timestamp" field 204, and "Caller ID" field 206, respectively.

In particular, in the example of FIG. 2, the first three calls were serviced by an IVR application with identifier "4," which is an application for an airline company, whereas the last three calls were serviced by an IVR application with identifier "5," which is an application for a shipping company. The first three calls were all placed on the same day from a single telephone number, while the last three calls were placed over the span of multiple days from a different single telephone number.

In data structure 200, information identifying the caller is stored in field 206 and, in the illustrated example, is shown to be a telephone number. However, as previously mentioned, the information identifying the caller is not limited to being a telephone number and may be any suitable information that can be used to identify the caller and distinguish the caller from other callers who access the IVR system. For example, information identifying the caller may comprise information such as automatic number identification (ANI) or ANI II digits, which may identify the type of network (e.g., cellular) from which the call originated. Additionally, ANI and ANI II digits may identify an area code associated with the call. As another example, information identifying the caller may comprise biometric information, such as a voiceprint or a voice model, which may be used to directly identify the caller using any suitable techniques (e.g., speaker recognition techniques, speaker verification techniques, etc.). As yet another example, information identifying the caller may comprise information that may be used to indirectly identify the caller (e.g., user ID, account ID, password, caller ID, an ID of device used to make the call, etc.). As yet another example, information identifying the caller may comprise information related to the geographic location (e.g., address, street, town, city, county, state, etc.) of the caller such as the geographic location of the caller and/or the local time at that geographic location. Such information may be obtained in any suitable way. In one non-limiting example, such information may be obtained from the area code of the caller, ANI digits of the caller, and/or ANI II digits of the caller. These examples are non-limiting as any other caller identifying information may be used.

A data record for a call may also store data reflecting the behavior of the caller during the call. In one embodiment, such data may be specific to an IVR application and may be stored in one or more application data fields in the data record. In the illustrative embodiment shown in FIG. 2, each data record includes two fields (i.e., "App Data 1" 208 and "App Data 2" 210) that are used to store information that is specific to the corresponding IVR application and can be used to store any information useful for the IVR application, but this is just a non-limiting example as any number (e.g., one, three or more) of data fields can be used for this purpose. In one embodiment wherein the IVR system may host IVR applications for multiple businesses or enterprises, each business/enterprise may be provided the ability to customize and specify what information is provided in each of the application data fields for the records corresponding to its IVR application.

In one non-limiting example shown in FIG. 2, a data record may store data identifying at least one service used by the caller during the call. In data structure 200, such information is stored in the "App Data 1" field 208. In the illustrated example, the service used by the caller in each of the first three calls enabled the caller to check on a flight status, and the service used by the caller in each of the last three calls enabled the caller to track a package. Of course, these are just examples, as various other types of services are possible.

In the example of FIG. 2, each data record also stores data identifying at least one subject of the service requested by the caller during the call. In data structure 200, such information is stored in the "App Data 2" field. In the illustrated example, the caller in each of the first three calls requested to check the status of a specific flight, which is identified by record locator "PN6SJ5X34." The caller in each of the last three calls requested to track one of two packages, each package being identified by a unique tracking number. As discussed above, the identifiers of the subject of the service may directly identify it (e.g., the flight number or tracking number for a package), or may indirectly do so by being a pointer to a location where identifying information is stored, or in any other suitable way.

Each data record in data structure 200 is shown as having five fields; however, this is for purposes of illustration only and is not a limitation of the present invention as any suitable number of fields may be used. For instance, any suitable number of fields may be used to store information identifying the caller, and any suitable number of fields may be used to store data associated with the call. As discussed above, in one embodiment the information from a call may be used to predict information about a future call. The type(s) of information that may be useful for predicting information about a future call can vary depending on the nature of the IVR application and service(s) provided thereby, so that any information useful for predicting any information about a call for an IVR application may be stored, as aspects of the invention are not limited in this respect.

In some embodiments, all or part of the data structure 200 that stores data associated with one or more calls with an IVR system may be stored on one or more storage devices that are part of (e.g., storage device(s) 116) the IVR system or are communicatively coupled to the IVR system. However, data structure 200 may be stored in any other suitable way, as the aspects of the invention described herein are not limited in this respect.

Figure 3A:
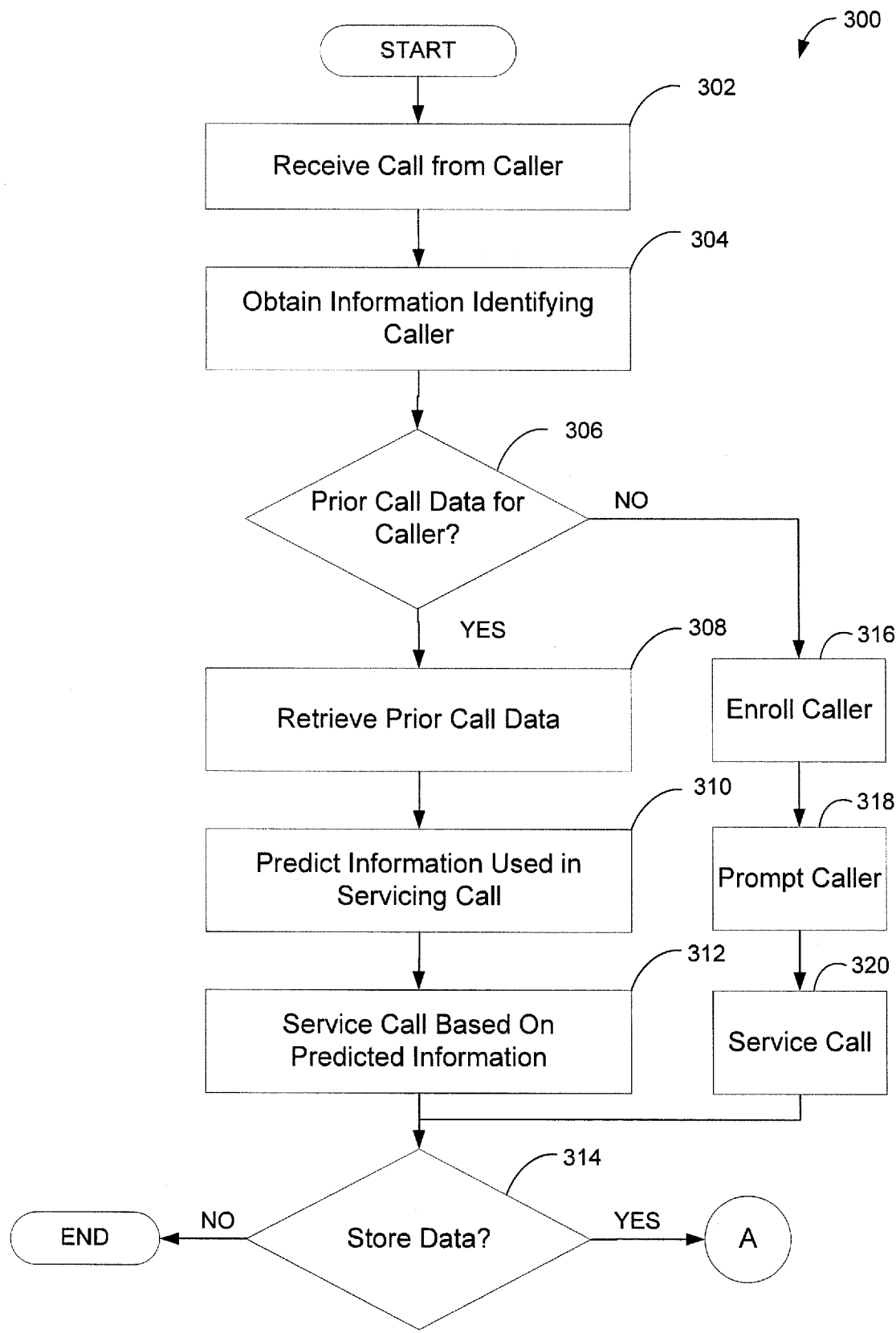
FIGS. 3A-3B show a flow chart of an illustrative process for servicing calls, in accordance with some embodiments of the present invention.
Figure 3B:
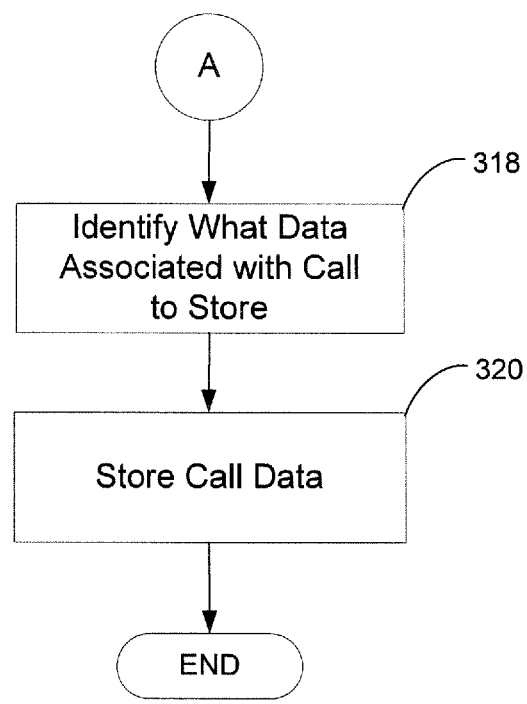

Regardless of what particular data associated with one or more prior calls by a caller is stored, where it is stored, and the format in which it is stored, the data may be used by an IVR system in servicing one or more later calls (e.g., another call by the caller or a call by another caller). FIGS. 3A-3B show an illustrative process 300 for servicing a call in this manner. Process 300 may be performed, at least in part, by an IVR system (e.g., IVR system 110).

Process 300 begins in act 302, where a call may be received from a caller. The call may be received by an IVR system, such as IVR system 110, and may be received in any suitable way. In an alternative embodiment (not shown), the call may be initiated by the IVR system.

Next, process 300 proceeds to act 304, where information identifying the caller is obtained. Information identifying the caller may be any suitable information and may be obtained in any suitable way. As previously mentioned, examples of information identifying the caller may include a telephone number such as the number from which the call originated, ANI digits, or ANI II digits, biometric information associated with the caller, and/or other identifying information associated with the caller. In some embodiments, information identifying the caller may be automatically provided (e.g., telephone number, ANI II digits) to the IVR system. Additionally or alternatively, in other embodiments, information identifying the caller may be gathered by the IVR system by interacting with the caller (e.g., by prompting the caller to provide a voiceprint, prompting the caller to answer a personal challenge, prompting the caller to input user name and a password or a pin code, or in some other way).

After the identifying information is obtained in act 304, process 300 proceeds to decision block 306, where it is determined whether any data associated with one or more prior calls, involving the caller identified by the information obtained in act 304, is available. For example, it may be determined, in decision block 306, whether any data reflecting caller behavior in one or more prior calls is available. As disclosed above, such data may include data identifying a service that the caller requested during one more prior calls, and optional information identifying at least one subject of the service that the caller requested, and/or any of the other types of data described above.

The determination of whether there is data associated with one or more prior calls made by the caller may be made in any suitable way. In some embodiments, the determination may be made based at least in part on the information identifying the caller obtained in act 304. For example, information identifying the caller may be used to determine whether any data associated with one or more prior calls including the identified caller is available on at least one storage device that the IVR system servicing the call may access in any suitable way. For example, information identifying the caller may be used to identify any data records which contain (and/or may be indexed by) all or at least a portion of the identifying information obtained in act 304. As a specific example, if the identifying information comprises a telephone number (e.g., 505-555-1212) and at least one data record containing this number (e.g., in the caller ID field of data structure 200) exists, then it may be determined that data associated with one or more prior calls made by the caller is available. In other embodiments, the identifying information obtained in act 304 may be used to index or map into other identifying data that may appear in one or more data records, so that the identifying information obtained in act 304 may not be of the type in the data record(s). For example, a telephone number obtained in act 304 could be mapped to identifying information of a type that may appear in the data record(s).

If it is determined, in decision block 306, that data associated with one or more prior calls including the caller is not available, process 300 proceeds to act 316, where a caller may be enrolled in a call history service provided by the IVR system that allows the IVR system to store data associated with calls made by the caller.

For embodiments in which callers are enrolled in the call history service, the caller may be enrolled in any suitable way. For instance, the caller may be asked whether the caller wishes to enroll in the call history service and may be provided information explaining features and benefits of the call history service (e.g., that information from one or more prior calls may be used to predict information useful in servicing one or more subsequent calls to streamline the subsequent call(s)). In response, the caller may decide whether to enroll in the call history service. By enrolling in the call history service, the caller may provide the IVR system with permission, explicitly or implicitly, to extract and/or store any suitable data associated with the call and/or any future calls that the caller may make. In addition, the caller may provide the IVR system with permission, explicitly or implicitly, to use any stored data associated with one or more calls made by the caller to service one or more future calls by the caller. While an enrollment process is used in some embodiments, not all embodiments are limited in this respect, and in other embodiments call information may be stored and used to service one or more future calls involving a caller without enrolling the caller or asking the caller's permission.

After the enrollment process in act 316, or in embodiments (not shown) where no enrollment is required, process 300 proceeds to act 318, where the user is prompted for information desired to service the call, and then to act 320 where the call is serviced using information obtained from the caller. Thereafter, the process proceeds to act 314, where the process proceeds as described below.

If it is determined in decision block 306 that data associated with one or more prior calls made by the caller is available, process 300 proceeds to act 308, where at least a portion of the data associated with one or more prior calls may be retrieved. The data to retrieve may be any suitable data and may be determined in any suitable way. For example, if there is a large amount of data available for a caller, all of the data may be retrieved in some embodiments. In other embodiments, a determination may be made of the amount of data to retrieve based on any suitable criteria. For example, a determination may be made based at least in part on the amount of data available and any computational constraints on retrieving and/or processing this data. For instance, if a large number of data records are available for a caller and the IVR system has a limited amount of time or resources to retrieve and/or process such data records, then not all the data records available for the caller may be retrieved.

In embodiments where only a portion of the data associated with one or more prior calls by the caller to the IVR system is retrieved, the retrieved portion of the data may be any suitable portion of the data. For example, recently-stored data records may be retrieved (e.g., data records created within the last day, last week, last month, etc.). Additional or other criteria also may be used. For example, only data records that store a particular kind of data (e.g., relating to a certain IVR application, a certain service provided by the IVR application, etc.) may be retrieved. As another example, only data records associated with one or more calls, involving the caller, made from a particular device or devices may be retrieved.

In some embodiments, any process used to retrieve data (e.g., any process used to determine what data to retrieve and/or how to retrieve it), as part of act 308, may be independent of any other process that may subsequently use the retrieved data to perform an action related to servicing a call with a caller. For example, regardless of the type and/or amount of data retrieved in act 308, any of numerous other processes may be used to analyze these retrieved data, as the retrieved data may provide evidence of the caller's calling history, and use the results of the analysis to predict what information may be used for servicing the call with the caller.

After data associated with one or more prior calls by the caller is retrieved in act 308, process 300 proceeds to act 310, where a prediction is made about some information that may be used in servicing the call. Predicting what information may be used in servicing the call may be done in any suitable way. For example, the prediction may be performed at least in part by analyzing the data associated with one or more prior calls of the caller with the IVR system.

Data associated with one or more prior calls of the caller with the IVR system may be analyzed in any suitable way to ascertain any suitable information useful in servicing a call, and may be performed in an IVR application-specific manner. In one embodiment, the information predicted may be information that would otherwise need to be entered by the caller, so that the caller need not enter the information. As discussed above, this can be particularly useful when the information is an alphanumeric string that is not words so that it may be difficult for a caller to remember and/or difficult for the ASR engine of the IVR system to accurately recognize. However, all aspects of the invention are not limited in this respect, as any suitable information may be predicted.

In some embodiments, data retrieved in act 308 may be analyzed to obtain at least a portion of the information entered by the caller during one or more prior calls (e.g., a sequence of menu selections, a password, information identifying a service requested, information identifying a subject of a requested service, etc.). As an example, the data retrieved in act 308 may comprise data reflecting behavior by the caller in one or more prior calls and may be analyzed to determine what service(s), if any, the caller requested in the prior call(s). If the analysis reveals that one or more services were requested, and if the service(s) has one or more particular subjects, data reflecting behavior by the caller in the prior call(s) may be further analyzed to determine the subject(s) of the requested service(s). As one non-limiting example, the analysis of data retrieved in act 308 may indicate that the caller has requested to track packages one or more times in prior call(s). The one or more prior calls may have been made within a time period of a predetermined length (e.g., one or multiple days, one or multiple weeks, one or multiple months, one or more multiple years, etc.). Further analysis of the data may be used to identify which package(s) the caller requested to be tracked in the prior call(s).

There are many other ways in which data associated with one or more prior calls by the caller may be analyzed and numerous other types and examples of information that may be obtained by such analysis. As another non-limiting example, analysis of prior call data may reveal patterns in the data that may be useful in predicting information for servicing a current call. Some non-limiting examples of patterns include how often one or more particular services were requested, how many times a specific piece of information was provided or requested, whether there are any temporal patterns in what the caller may be calling about (e.g., resolve billing questions at the end of each month). These examples are not limiting, as aspects of the invention described herein are not limited in any way by the type of data that may be analyzed or by the analysis techniques that may be applied.

In act 310, the IVR system may predict some information that may be used in servicing the caller's call based at least in part on results of analyzing the data associated with one or more prior calls by the caller retrieved in act 308. The prediction may be done in any suitable way, and may depend on the particular IVR application that the caller is interacting with. For example, the prediction may be done using a set of application-specific rules (e.g., if the IVR application being accessed offers a package tracking service, a rule may be employed whereby if the caller asked to track the same package the last two times the caller accessed the IVR system, the IVR system predicts that the caller may be calling to track the same package and may prompt the caller to confirm whether the caller wishes to track the same package). Such rules may be implemented using a rules engine or any other suitable technique, as the way in which prediction rules are implemented is not a limitation of the aspects of the present invention described herein. Additionally or alternatively, prediction may be done by using statistical inference techniques to predict which information may likely be used in servicing the call. Any suitable statistical inference techniques can be used (e.g., those that rely on a training data to build a probabilistic model to predict the probability of the caller requesting a particular service and/or subject thereof), as the aspects of the present invention described herein are not limited to the use of any particular statistical inference techniques.

In some embodiments, the IVR system may predict some information that may be used in servicing the caller's call based at least in part on other information, in addition to or instead of, results of analyzing the data associated with one or more prior calls by the caller retrieved in act 308. In such cases, the IVR system may have access to other sources of information about the caller including, but not limited to, the caller's behavior. As one non-limiting example, the IVR system may have access to data reflecting the behavior of the caller on one or more websites (e.g., requesting to track a package through the website of a shipping company, checking the flight status on a website of an airline, checking the balance of a bank account on a bank website, etc.). However, an IVR system may access any other source of information about the caller as aspects of the invention as described herein are not limited in this respect.

In addition to predicting what information may be used in servicing the caller's call, the IVR system may determine a confidence value corresponding to the predicted information in any suitable way. The confidence value may indicate how confident the IVR system is that the predicted information will be used in servicing the call. For example, if during five of the caller's last six calls, the caller requested to track a package but, during the sixth call the caller requested to resolve a billing question, the system may recognize that a purpose of the caller's current call could be to track the package or address the same billing question. However, the system may recognize that it is more likely that the purpose of the current call is to track the package than to resolve a billing question, and therefore assign a higher confidence value to a prediction that data associated with tracking a package may be used in servicing the call than to a prediction that data associated with resolving a billing question may be used in servicing the call.

Confidence values may be calculated in any suitable way, and may be application-specific. For example, in the package tracking versus billing question example, the IVR system may have a rule or statistical model which indicates that callers rarely call multiple times to resolve the same billing question (e.g., because most billing inquiries are resolved in one call), whereas callers far more often call multiple times to track a package. Of course, this is merely an example, as the precise way in which confidence values are calculated is not a limitation of the aspects of the present invention described herein.

After information to use in the call is predicted in act 310, the predicted information may be used to service the call in act 312 of process 300. In some embodiments, the predicted information may be used to service the call if the confidence value associated with the predicted information is greater than a predetermined threshold. However, in other embodiments the predicted information may be used to service the call regardless of the confidence value associated with the predicted information. Servicing the call may comprise interacting with the caller in any suitable way. For example, the IVR system may service the call by performing any acts a conventional IVR system may perform in servicing the call (e.g., by receiving any suitable input from the caller and/or presenting the caller with any suitable output). In interacting with the caller, the IVR system may also take advantage of the information predicted in act 310.

The predicted information may be used in any suitable way. In some embodiments, it may be used to alter the way in which the IVR system interacts with the caller while servicing the call, so that the IVR system services the call differently than if it had no predicted information available. For example, the IVR system may adapt the flow of the call based at least in part on the predicted information. This is exemplified by the previously-described package tracking example in which the IVR system predicted that the caller wanted to track the package with tracking number "HB7JA379G" and, instead of prompting the caller to provide the tracking number, asked the caller to confirm that this is the package the caller wanted to track. There are many other ways to use the predicted information to service the call, examples of which are described below with reference to FIG. 5, as aspects of the invention related to determining how the system interacts with the caller based on the predicted information are not limited to doing so in any particular way.

After servicing the caller's call in act 312, process 300 proceeds to decision block 314, where it may be determined whether to store any data associated with the call. This determination may be made in any suitable manner. For instance, if a caller is enrolled in the caller history service or there exists data associated with one or more prior calls made by the caller, it may be determined that at least a portion of data associated with the call should be stored. Alternatively, if the caller is not enrolled in the caller history service and has not otherwise provided permission to have the IVR system store data associated with calls made by the caller, it may be determined that no data associated with the call should be stored.

If it is determined, in decision block 314, that the data associated with the call should not be stored, then process 300 terminates. Alternatively, if it is determined that at least a portion of the data associated with the call should be stored, process 300 proceeds to act 318 (FIG. 3B), where it is identified what data associated with the call should be stored.

Any suitable technique may be used to identify what data associated with the call to store. In some embodiments, the data to store may be identified in advance of the call. For example, an IVR application may be designed to store some data relating to every call. Such data may include a timestamp of the call, information identifying the caller, data reflecting the caller's behavior during the call, etc. Additionally or alternatively, the data to be stored may be identified based at least in part on information collected during the call. For example, the decision to store data associated with the call may depend on the behavior of the caller. As non-limiting examples, the decision to store data associated with the call may be made if the caller requests a particular service or if the caller selects a certain menu option, although other evaluation criteria may be used.

As another example, useful data of a particular type that reflect caller behavior may be identified (e.g., by the IVR application designer) in advance of the call and the IVR application may store this pre-identified type of data for each call. Useful data may be any data reflecting caller behavior that may be useful for servicing subsequent calls, and may be specific to an IVR application or more general. Examples of useful data reflecting caller behavior include data identifying the service requested by the caller in the call, data identifying the subject of the call, and data identifying menu options selected by the caller when presented with a menu. These are non-limiting examples, as aspects of the invention described herein are not limited in the types of data associated with a call that may be stored.

Data may be stored as any suitable type of data. In some embodiments, stored data may be acoustic data. For example, if a caller provides audible input during a call (e.g., by speaking) at least a portion of the provided input may be stored. As another example, stored data may be text. For example, any audible input may be converted into text using any suitable speech recognition techniques. However, the above examples are merely illustrative as stored data may be of any other suitable type and in embodiments wherein stored data is acoustic and/or text data, such data may be obtained in any other suitable way.

The data associated with the call may be stored in any suitable location and in any suitable format. For example, the data may be stored in at least one storage device that is part of or communicatively coupled to the IVR system (e.g., storage device(s) 116. The data may be stored in any suitable format. For example, the data may be stored as one or more data records in a data structure such as data structure 200 described with reference to FIG. 2, or in any other suitable manner.

In accordance with one embodiment, the data associated with a call may be stored in association with information identifying the caller. This may be done in any of numerous ways. For example, the data may be stored together with the information identifying the caller (e.g., the information identifying the caller may be stored in a data record with the other data associated with the call as shown in FIG. 2). Additionally or alternatively, the data may be stored such that it may be retrieved based at least in part on the information identifying the caller (e.g., the caller identifying information may be used as a key or index to look up the stored data in a data structure). After data associated with the call is stored, process 300 terminates.

It should be recognized that process 300 is merely illustrative and that many variations of process 300 are possible. For example, in the illustrated embodiment, acts 318-320 for storing data associated with a call are shown as occurring after the call is serviced. However, in other embodiments, these acts may occur while the call is being serviced. As another example, in the illustrated embodiment, only data associated with one or more prior calls involving the same caller are described as being used to predict information used to service the current call. However, in other embodiments, data associated with one or more calls made by at least one other caller may be used to predict information used to service the call, either with or without the use of any data from prior calls of the same caller.

In some embodiments, for example, process 300 may be adapted to predict information used to service a call with a caller by using data associated with one or more prior calls made by one or more other callers. As previously mentioned, the Applicants have recognized that multiple (e.g., at least one, at least 10, at least 100, at least 1000, at least 10,000, etc.) callers may exhibit common behavior patterns during calls with the IVR system and that such behavior patterns may be used to predict the behavior of a caller, and that the predicted behavior may be used to service the call with the caller. For example, an IVR system may service a customer of an electric utility by predicting that a caller may be calling to report a power outage if other callers from the same area code have previously called to report a power outage, and, as a result, streamline its interaction with the caller (e.g., by asking the caller if he is calling to report a power outage and, if so, informing him that the power outage has already been reported and crews are en route to fix the problem). As another example, an IVR system may service a caller from a business that ships many packages and may predict that the caller is calling to request a package pickup because other calls from others in the company have been placed to request that packages be picked up. These are merely non-limiting examples, as any data associated with one or more prior calls by one or more other callers may be used to predict information for servicing a call.

Accordingly, in some embodiments, process 300 may be adapted to identify data reflecting behavior by one or more other callers in one or more prior calls with the IVR system. The data reflecting behavior by the other caller(s) may be identified in any suitable way and, for example, may be identified using any suitable data associated with one or more prior calls between other callers and the IVR system.

In some embodiments, data reflecting behavior by one or more other callers may be identified by using information identifying the caller. As one non-limiting example, data reflecting behavior by the other caller(s) may be identified by identifying data related to callers whose identifying information at least partially matches the identifying information of the caller. For example, if the information identifying the caller includes a telephone number, the data reflecting behavior by other callers may be identified by identifying data related to callers whose identifying information includes a telephone number that at least partially matches the caller's telephone number. As a specific example, data reflecting behavior by other callers may be identified by identifying data related to callers calling from the same area code as the caller. As another specific example, data reflecting behavior by other callers may be identified by identifying data related to callers calling from the same business as the caller. As another example, if the information identifying the caller includes ANI and/or ANI II digits, the data reflecting behavior by other caller(s) may be identified by identifying data related to callers whose identifying information includes ANI and/or ANI digits that at least partially match the ANI and/or ANI II digits of the caller. As yet another example, the data reflecting behavior by other caller(s) may be identified by identifying data related to callers whose geographic location (e.g., address, street, town, city, county, state, etc.) is the same or proximate to the geographic location of the caller.

Additionally or alternatively, data reflecting the behavior of one or more other callers in one or more prior calls with the IVR system may be identified based on a common behavior pattern of callers during one more prior calls with the IVR system. The behavior pattern may be any suitable behavior pattern and may be used to predict useful information for servicing the call with the caller. As one non-limiting example, the behavior pattern may comprise requesting a service also requested by other callers. For example, the behavior pattern may be calling, from a particular area code, to report a power outage. This behavior pattern may be used to predict that, if the caller is calling from the same area code, the caller is likely to report a power outage. As another example, the behavior pattern may be calling between 7 am and 8 am to report that a newspaper has not been delivered. This behavior pattern may be used to predict that, if the caller is calling between 7 am and 8 am, the caller is likely calling to report that his newspaper has not been delivered. As yet another example, the behavior pattern may be calling to pay a bill two days before the bill was due. This behavior pattern may be used to predict that, if the caller is calling two days before a bill is due, the caller is likely calling to pay the bill. A behavior pattern, such as any of the above-described behavior patterns or any other behavior pattern, may be identified in any suitable way and, for example, may be identified by using any suitable technique (e.g., rule-based, statistical, machine learning, etc.) to analyze data associated with one or more prior calls between the IVR system and other callers.

After data reflecting the behavior of one or more other caller(s) is identified, process 300 may be adapted to use these data in any suitable way. For example, any suitable portion of such data may be retrieved in any suitable way and, for example, may be retrieved as previously described with reference to block 308.

Subsequently, process 300 may be used to predict some information that may be used in servicing the caller's call based at least in part on results of analyzing data reflecting behavior by one or more other callers in one or more prior calls with the IVR system. The prediction may be done in any suitable way, examples of which were previously described with reference to act 310. The predicted information may then be used to service the caller's call. This also may be done in any suitable way, examples of which were previously described with reference to act 312.

It should be recognized that, in some embodiments, process 300 may also be adapted to predict information used to service a call with a caller by using data associated with one or more prior calls made by the same caller, as well as data associated using with one or more prior calls made by one or more other callers.

An IVR system in accordance with the aspects of the invention described herein may collect information associated with a call (e.g., from the caller or otherwise) in any suitable way. For example, in some embodiments, an IVR system may use one or more dialog modules to collect the desired information. In some embodiments, multiple dialog modules may be employed, and each dialog module may be configured to gather a specific piece of information desired by the IVR system to service the call. However, the embodiments that are directed to the use of dialog modules are not limited in this respect, as a single dialog module can be configured to collect all the desired information, or multiple dialog modules can be employed, but wherein not all are limited to collecting only one type of information. Furthermore, it should be recognized that an IVR system may obtain any desired information in any suitable way and is not limited to using dialog modules for this purpose.

Figure 4:
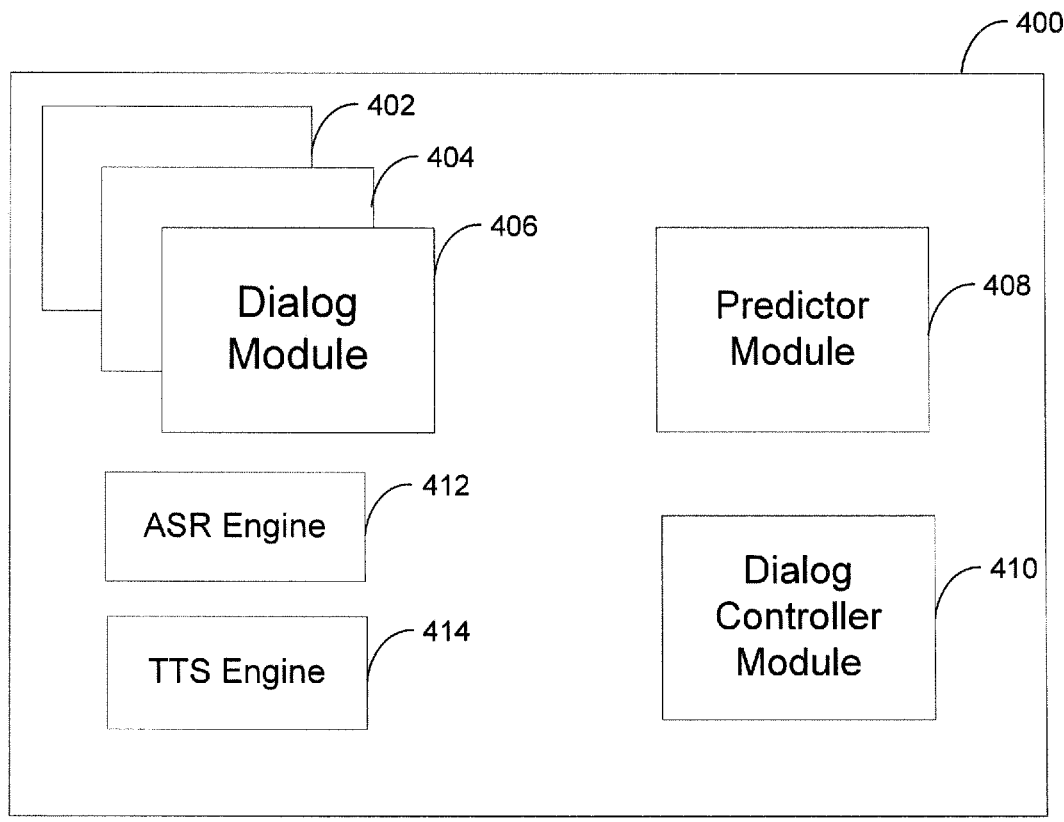
FIG. 4 is a block diagram of software components of an illustrative interactive voice response system, in accordance with some embodiments of the present invention.

Components of an illustrative IVR system 400 that may be configured to implement the aspects of the present invention described herein are shown in FIG. 4. Illustrative IVR system 400 may be arranged in an environment like the illustrative IVR system 110 shown in FIG. 1. IVR system 400 may be implemented using hardware components, software components, or any suitable combination thereof. FIG. 4 illustrates some of the software components that may be used to implement IVR system 400. The software components may be stored as processor-executable instructions in at least one storage device in or associated with IVR system 400.

In the embodiment illustrated, the software components include a plurality of dialog modules 402, 404, and 406, a predictor module 408, a dialog controller module 410, ASR engine 412, and text-to-speech (TTS) engine 414. This combination and the number of modules is merely illustrative as software components of IVR system 400 may include any suitable number of dialog modules, predictor modules, ASR engines, TTS engines, and/or any other software components, and may divide the functionality of IVR system differently across different software components.

IVR system 400 may manage an interaction with a caller in any suitable way. In some embodiments, the IVR system may use a dialog controller module 410 to manage the interaction by managing the flow of the call in any suitable way. For example, dialog controller module 410 may mange the call flow by identifying one or more dialog modules (e.g., dialog modules 402, 404, and 406) that may be used for interacting with the caller, and may determine an order in which the one or more identified dialog modules are used to interact with the caller.

Dialog controller module 410 may identify which dialog module(s) to use for interacting with the caller and when to use the identified module(s) in the call flow. This may be done in any suitable way. For example, dialog controller 410 may manage the call flow by using a predefined sequence of dialog modules. As another example, dialog controller 410 may select the dialog module to use at various stages of the call flow based at least in part on information collected during the call and/or any data associated with one or more prior calls with the caller.

A dialog module may be configured to gather a desired piece of information that may be used by the IVR system to service the call. This may be done in any suitable way. For example, the dialog module may be configured to gather the piece of information from the caller by interacting with the caller during the call in any suitable way. For example, the dialog module may be configured to prompt the caller to provide the piece of information and/or prompt the caller to confirm the piece of information. In addition to or instead of interacting with the caller, the dialog module may gather the piece of information from information gathered from the caller earlier in the same call by another dialog module.

Additionally or alternatively, a dialog module may gather the piece of information from a source other than from the caller during the call. For example, a dialog module may gather the piece of information from data associated with one or more prior calls (e.g., made by the caller) with the IVR system.

A dialog module may gather the piece of information from data associated with one or more prior calls made by the caller in any suitable way. In some embodiments, the dialog module may gather the piece of information based at least in part on one or more outputs of at least one predictor module 408.

Predictor module 408 may be configured to predict information to be used in servicing the call by analyzing data associated with one or more prior calls (e.g., by the same caller). For example, predictor module 408 may be configured to predict information to be gathered by one or more of the dialog modules based on the analyzed data and may provide the dialog module(s) with the predicted information. As another example, predictor module 408 may be configured to predict information that may be used by dialog controller module 410 to manage the call flow. The dialog manager may use such predicted information to identify one or more dialog modules that may be used and the order in which they may be used for interacting with the caller. For example, if the predictor module predicts that the caller is likely to request a specific service (e.g., to track a package), dialog controller module 410 may select an appropriate dialog module to interact with the user (e.g., a dialog module that may desire to gather a tracking number from the caller).

The predictor module may predict information to use in servicing the call in any suitable way, examples of which were previously described with reference to FIG. 3. In some embodiments, the prediction may be done in an IVR application-specific way (e.g., using a set of application-specific rules or application-specific statistical inference models), and may comprise outputting a confidence value corresponding to the predicted information. As previously described, such a confidence value may indicate how certain the prediction module is that the prediction information will be used in servicing the call.

In some embodiments, even if the dialog module gathers a specific piece of information from a source other than the caller (e.g., from the predictor module) or from information already collected during the current call, the dialog module may nonetheless interact with the caller to perform additional acts related to gathering or confirming the piece of information. For example, the dialog module may interact with the caller to confirm that a piece of information obtained from another source is the information that the caller would have provided if prompted (e.g., "Are you calling to track package HB7JA379G?"). As another example, the dialog module may provide the caller with an acknowledgement that it has obtained the piece of information from the other source (e.g., "Retrieving tracking information for package HB7JA379G. If calling for other purpose, please say 'other'"). If the predicted information is correct, this may result in a caller receiving the information he desires more quickly than if the tracking number had to be confirmed. As yet another example, the dialog module may prompt the caller to enter the piece of information even if the dialog module obtained the piece of information from the other source. For example, this may be done if the piece of information obtained by the dialog module from the predictor module is associated with a low confidence value. The dialog module may choose to perform any of these acts using any suitable criteria and may make the choice based at least in part on a confidence value associated with the predicted information. This is described in greater detail below with reference to FIG. 5.

As previously discussed, each dialog module may interact with a caller by obtaining information from the caller and/or presenting information to the caller. To interact with the caller using speech, a dialog module may use speech recognition and text-to-speech synthesis technology. In the illustrated embodiment, such functionality may be provided by ASR engine 412 and TTS engine 414.

ASR engine 412 may be configured to process any speech signals provided to IVR system 400 by a caller and produce a textual representation of the speech, and comprises one or more computer programs that, when executed on a processor (e.g., server 112 or any other suitable processor), are configured to do so. For example, ASR engine 412 may be configured to perform speech recognition on input acoustic waveforms provided to the IVR system 400 using one or more acoustic models, language models, dictionaries, vocabularies, grammars and/or any one or combination of these or other suitable ASR techniques, as aspects of the invention are not limited in any way by the specific implementation of the ASR engine.

TTS engine 414 may be configured to convert a textual representation of content into speech, and comprises one or more computer programs that, when executed on a processor (e.g., server 112 or any other suitable processor), are configured to do so. TTS engine 414 may use concatenative synthesis, formant synthesis, model-based synthesis, articulatory synthesis, HMM-based synthesis, sinewave synthesis, or any other approach to speech synthesis, as aspects of the present invention are not limited in any way by the specific implementation of the TTS engine.

Figure 5:
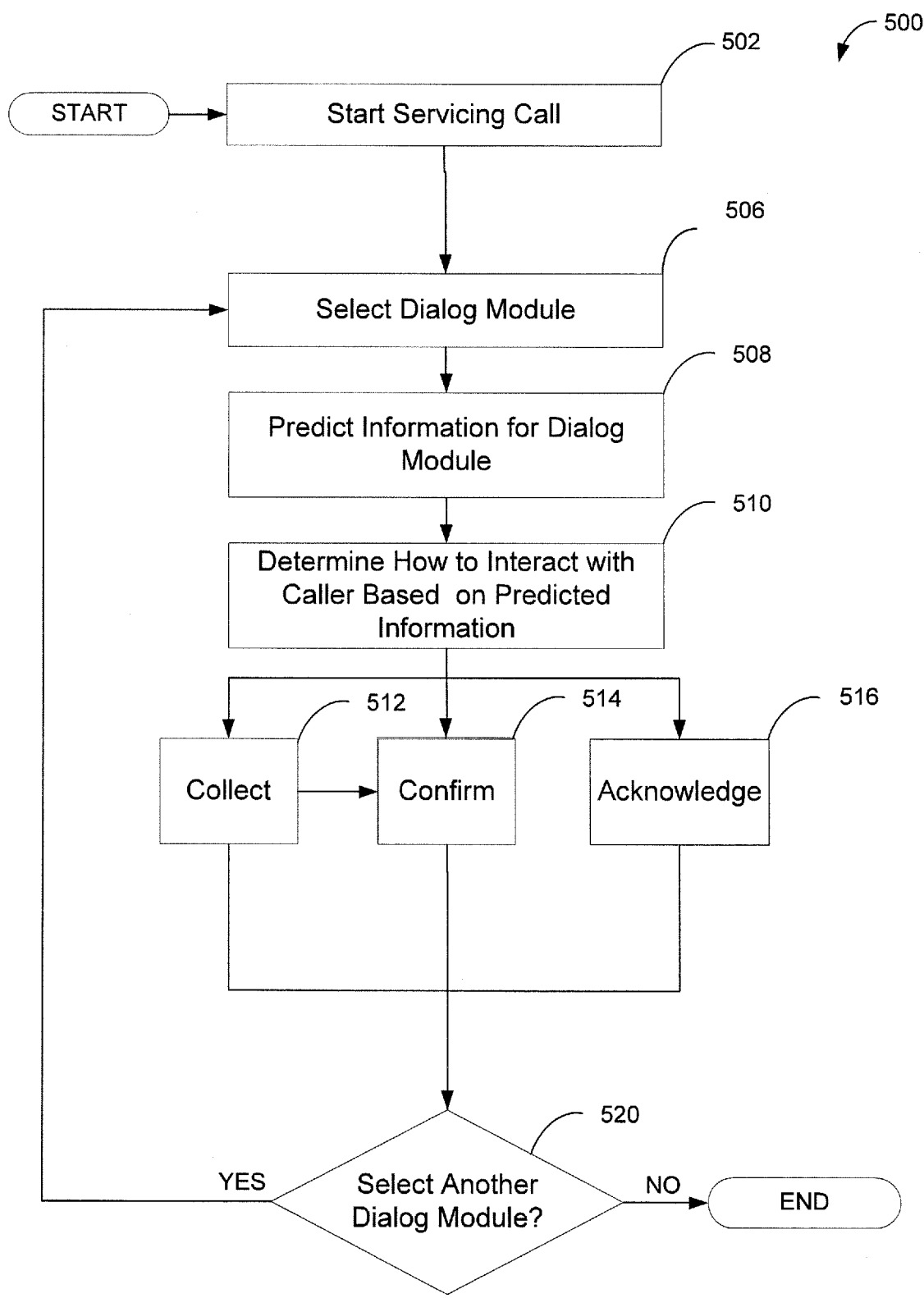
FIG. 5 is a flow chart of an illustrative process for servicing a call by using an interactive voice response system, in accordance with some embodiments of the present invention.

An illustrative process for using dialog modules to gather information from a caller is now described with reference to FIG. 5. Process 500 may be performed at least in part by an IVR system such as IVR system 110 (FIG. 1) or IVR system 400 (FIG. 4).

Process 500 begins in act 502, where a call from a caller is received by the IVR system and the IVR system begins to service the call. The call may be received in any suitable way, examples of which are discussed above, as the way in which the call is received is not a limitation of the present invention.

Process 500 then proceeds to act 506, where a dialog module for interacting with the caller is selected. The dialog module may be selected in any of numerous ways. For example, a dialog module controller (e.g., dialog controller module 410) may select a dialog module using any suitable criteria. As previously mentioned, in one non-limiting example, the dialog module controller may select a dialog module based on information predicted by the predictor module.

Accordingly, after a dialog module is selected in act 506, process 500 proceeds to act 508, where information to use in servicing the call may be predicted. For example, in act 508, information that the selected dialog module desires to gather may be predicted. The prediction may be performed in any suitable way (e.g., in the same way described with reference to act 310 of process 300). For example, the prediction may be performed based at least in part on analyzing data associated with one or more prior calls (e.g., by the caller and/or one or more other callers) with the IVR system. As discussed above, such data may include, but is not limited to, data reflecting the behavior of the same caller during one or more prior calls. Additionally or alternatively, such data may be data reflecting the behavior of one or more other callers during one or more prior calls. The prediction may be performed by any suitable component of an IVR system (e.g., by prediction module 408 described with reference FIG. 4).

Process 500 next proceeds to act 510, where the dialog module determines how to interact with the caller. A dialog module may interact with the caller in any suitable way. For example, the dialog module may determine to interact with the caller by prompting the caller to provide information the dialog module is configured to gather. In this case, process 500 proceeds to act 512, where the caller is prompted to provide such information (e.g., "please enter tracking number"). Alternatively, the dialog module may determine to interact with the caller by prompting the caller to confirm predicted information the dialog module is configured to gather. In this case, process 500 proceeds to act 514, where the caller is prompted to confirm information that the IVR system predicts the caller is calling about (e.g., "please confirm that the tracking number is "Z12431"). As another alternative, the dialog module may determine to interact with the caller by acknowledging to the caller that it already has information it is configured to gather. In this case, process 500 proceeds to act 516, where the caller is provided with the acknowledgment (e.g., "Retrieving tracking information for package HB7JA379G. If calling for other purpose, please say 'other'").

The determination of which of the above-described acts to perform may be made in any suitable way. For example, the dialog module may determine how to interact with the caller based at least in part on the information predicted in act 508. In some embodiments, the dialog module may determine how to interact with the caller based on a confidence value associated with the predicted information. Some non-limiting examples of making such a determination are described in greater detail below.

The dialog module may determine to prompt the caller to provide the information the dialog module is configured to gather in any of numerous scenarios. For example, if the information predicted in act 508 does not include the information the dialog module is configured to gather, the dialog module may determine that it should prompt the caller to provide this information. Alternatively, even if the predicted information includes the information the dialog module is configured to gather, the dialog module may determine that it should prompt the caller to provide this information. For example, if the confidence value associated with the predicted information is below a predetermined threshold, this may indicate that the IVR system has low confidence that the predicted information is likely to be the same as the information the caller may provide the dialog module were the caller prompted to provide such information.

The dialog module may determine to prompt the caller to confirm the information the dialog module is configured to gather in any of numerous scenarios. For example, the dialog module may prompt the caller to confirm the information the dialog module is configured to gather, if the predicted information includes the information that the dialog module is configured to gather, but if the confidence value indicates that the dialog module is not sufficiently confident that the predicted information is the information the caller would enter were the caller prompted to provide such information. Such a determination based on confidence value can be done in any suitable way. In one non-limiting example, a caller is prompted for clarification if the confidence value is in a predetermined range: below a first predetermined threshold (e.g., above which the dialog module would be sufficiently confident that it has the information the caller would have entered were the caller prompted to do so, so that no confirmation is performed), but above a second predetermined threshold (e.g., below which the dialog module would simply prompt the caller to provide the information).

The dialog module may determine to not prompt the caller to provide any information in any of numerous scenarios. For example, if the confidence value associated with the predicted information is high (e.g., above a predetermined threshold) and the predicted information includes information that the dialog module is configured to gather, the dialog module may be configured not to prompt the caller to input any information. In this case, the dialog module may interact with the caller by providing an acknowledgement that the dialog module has the information it is configured to gather in any of the ways discussed above.

In addition to being used for determining how a dialog module may interact with the caller, information predicted in act 508 may also be used for any of numerous other purposes. For example, the information may be used in any of numerous ways to improve the recognition performance of an automatic speech recognition engine (e.g., ASR engine 412) in recognizing words spoken by the caller. In this respect, knowledge of input that the caller provided in one or more prior calls may be helpful in recognizing input provided by the caller during the current call. As a non-limiting example, an ASR engine may have access to acoustic models, grammars, language models, dictionaries, and/or other components, that may be tailored to a particular IVR application and, optionally, to a service provided by the IVR application. Input provided by the caller in one or more prior calls may be used to select one or more ASR engine components tailored to the IVR application and, optionally, the service identified in the input, and may lead to improved speech recognition performance.

After executing at least one of acts 510-516, process 500 proceeds to act 520, where it is determined whether the IVR system should select another dialog module to interact with the caller. This determination may be made in any of numerous ways. For example, if the call ended and/or the IVR system has completed servicing the call, it may be determined that the IVR system need not select another module to interact with the caller. On the other hand, if the IVR system has not completed servicing the call, it may be determined that the IVR system should select another dialog module to interact with the caller to complete servicing the call.

If it is determined that the IVR system should select another dialog module to interact with the caller, process 500 loops back to act 506 and acts 506-520 be repeated. If, on the other hand, it is determined, in act 520, that the IVR system should not select another dialog module, process 500 terminates.

The above-described embodiments of the present invention can be implemented in any of numerous ways. For example, the embodiments may be implemented using hardware, software or a combination thereof. When implemented in software, the software code may be executed on any suitable processor or collection of processors, whether provided in a single computer or distributed among multiple computers.

Such computers may be interconnected by one or more communication media (e.g., networks) in any suitable form, including a local area network (LAN) or a wide area network (WAN), such as an enterprise network, an intelligent network (IN) or the Internet. Such networks may be based on any suitable technology and may operate according to any suitable protocol and may include wireless networks, wired networks, and/or fiber optic networks.

Figure 6:
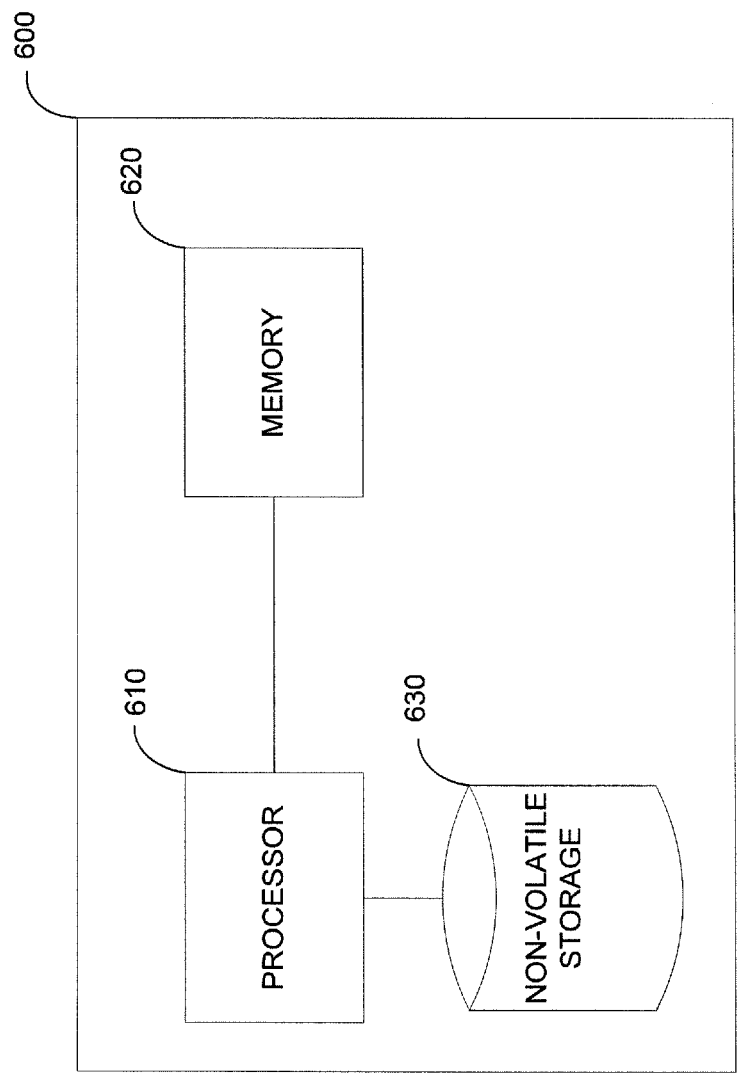
FIG. 6 is a block diagram of an illustrative computer system that may be used in implementing aspects of the present invention.

An illustrative implementation of a computer system 610 that may be used in connection with any of the embodiments of the invention described herein is shown in FIG. 6. The computer system 600 may include one or more processors 610 and one or more articles of manufacture that comprise non-transitory computer-readable storage media (e.g., memory 620 and one or more non-volatile storage media 630). The processor 610 may control writing data to and reading data from the memory 620 and the non-volatile storage device 630 in any suitable manner, as the aspects of the invention described herein are not limited in this respect. To perform any of the functionality described herein, the processor 610 may execute one or more processor-executable instructions stored in one or more non-transitory computer-readable storage media (e.g., the memory 620), which may serve as non-transitory computer-readable storage media storing processor-executable instructions for execution by the processor 610.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Processor-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more methods, of which examples (FIG. 3 and FIG. 5) have been provided. The acts performed as part of each method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method for servicing a call between a caller and an interactive voice response (IVR) system, the method comprising:
   using at least one processor to perform:
      identifying data reflecting behavior by one or more other callers, in one or more prior calls with the IVR system, whose identifying information at least partially matches information identifying the caller; and servicing the call by predicting information to be used in servicing the call, wherein the predicting comprises analyzing the identified data reflecting behavior by one or more other callers in the one or more prior calls with the IVR system, wherein each of the one or more other callers is different from the caller.

2. The method of claim 1, wherein the behavior by the one or more other callers during the one or more prior calls comprised requesting a service provided by the IVR system, and wherein the predicting further comprises:
predicting that the caller is calling to request the service by analyzing data reflecting the behavior of the one or more other callers during the one or more prior calls.

3. The method of claim 1, wherein the information identifying the caller comprises a telephone number and the identifying comprises:
identifying the data reflecting behavior by the one or more other callers by identifying data related to callers whose telephone number at least partially matches the telephone number.

4. The method of claim 3, wherein identifying data related to callers whose telephone number at least partially matches the telephone number comprises identifying data related to callers calling from a same area code as the caller.

5. The method of claim 3, wherein identifying data related to callers whose telephone number at least partially matches the telephone number comprises identifying data related to callers calling from a same business as the caller.

6. The method claim 1, wherein the one or more other callers conducted the one or more prior calls with the IVR system within a day of the call between the caller and the IVR system.

7. The method of claim 1, wherein the one or more other callers conducted the one or more prior calls with the IVR system within a week of the call between the caller and the IVR system.

8. A system for servicing a call between a caller and an interactive voice response (IVR) system, the system comprising:
at least one processor programmed to:
identify data reflecting behavior by one or more other callers, in one or more prior calls with the IVR system, whose identifying information at least partially matches information identifying the caller; and
service the call by predicting information to be used in servicing the call, wherein the predicting comprises analyzing the identified data reflecting behavior by one or more other callers in the one or more prior calls with the IVR system, wherein each of the one or more other callers is different from the caller.

9. The system of claim 8, wherein the behavior by the one or more other callers during the one or more prior calls comprised requesting a service provided by the IVR system, and wherein the at least one processor is programmed to:
predict that the caller is calling to request the service by analyzing data reflecting the behavior of the one or more other callers during the one or more prior calls.

10. The system of claim 8, wherein the information identifying the caller comprises a telephone number and the at least one processor is programmed to:
identify the data reflecting behavior by the one or more other callers by identifying data related to callers whose telephone number at least partially matches the telephone number.

11. The system of claim 10, wherein identifying data related to callers whose telephone number at least partially matches the telephone number comprises identifying data related to callers calling from a same area code as the caller.

12. The system of claim 10, wherein identifying data related to callers whose telephone number at least partially matches the telephone number comprises identifying data related to callers calling from a same business as the caller.

13. The system of claim 8, wherein the one or more other callers conducted the one or more prior calls with the IVR system within a day of the call between the caller and the IVR system.

14. The system of claim 8, wherein the one or more other callers conducted the one or more prior calls with the IVR system within a week of the call between the caller and the IVR system.

15. An interactive voice response (IVR) system configured to service calls from a plurality of callers, the IVR system comprising:
a dialog module configured to gather information for the IVR system, wherein for a call from a caller, the dialog module is configured to gather at least some of the information used by the IVR system to service the call based at least in part on data reflecting behavior by one or more other callers in one or more prior calls with the IVR system, wherein identifying information of the one or more callers at least partially matches information identifying the caller, and wherein each of the one or more other callers is different from the caller,
wherein the data reflecting behavior by the one or more other callers is identified by using information identifying the caller.

16. The IVR system of claim 15, further comprising:
a predictor module configured to predict, from the data, the at least some of the information used by the IVR system to service the call,
wherein the dialog module is further configured to gather the at least some of the information used by the IVR system to service the call based at least in part on output of the predictor module.

17. The IVR system of claim 15, wherein the information identifying the caller comprises a telephone number and the predictor module is further configured to:
identify the data reflecting behavior by the one or more other callers by identifying data related to callers whose telephone number at least partially matches the telephone number.

18. The IVR system of claim 15, wherein the one or more other callers conducted the one or more prior calls with the IVR system within a day of the call between the caller and the IVR system.

19. The IVR system of claim 15, wherein the one or more other callers conducted the one or more prior calls with the IVR system within a week of the call between the caller and the IVR system.

* * * * *